No. 847,244. PATENTED MAR. 12, 1907.
D. F. CURTIN.
BUTTER WEIGHING AND COMPUTING DEVICE.
APPLICATION FILED JULY 7, 1906.
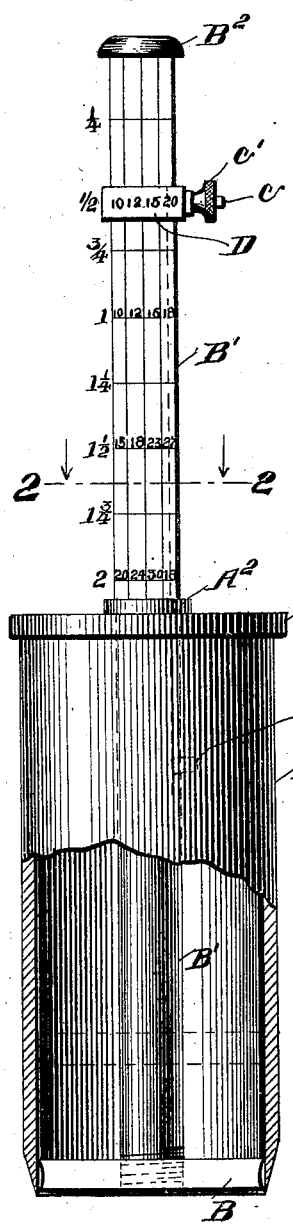
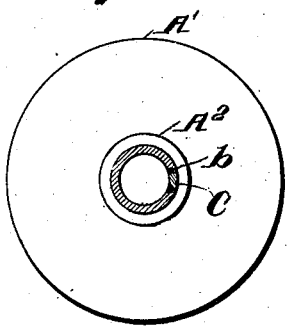
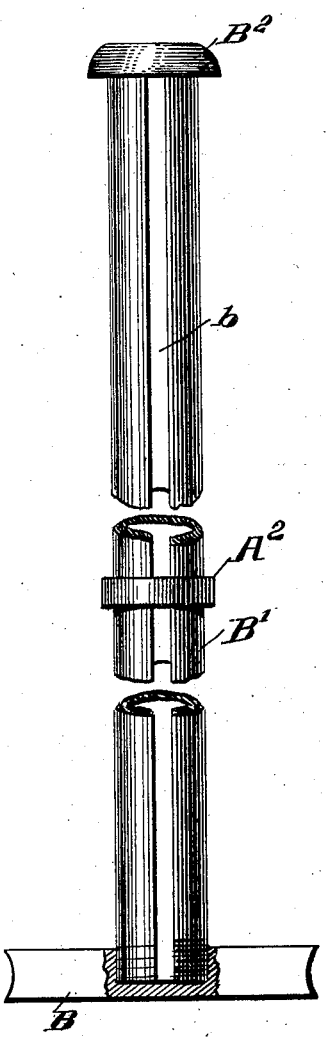
WITNESSES
INVENTOR
DAVID F. CURTIN.
BY
ATTORNEYS

UNITED STATES PATENT OFFICE.

DAVID F. CURTIN, OF ST. LOUIS, MISSOURI.

BUTTER WEIGHING AND COMPUTING DEVICE.

No. 847,244.   Specification of Letters Patent.   Patented March 12, 1907.

Application filed July 7, 1906. Serial No. 325,152.

*To all whom it may concern:*

Be it known that I, DAVID F. CURTIN, a citizen of the United States, and a resident of St. Louis, Missouri, have invented certain new and useful Improvements in Butter Weighing and Computing Devices, of which the following is a specification.

My invention relates to improvements in devices for forming and cutting butter into rolls, cubes, or pats of predetermined size and weight and also computing the price of same.

The object of my invention is to produce a device which shall be cheap, simple, and convenient and one by means of which a roll, cube, or pat of butter may be cut of a predetermined size and weight and in which the price of the butter, &c., is immediately computed.

To these ends my invention consists in certain novel features of construction, arrangement, and combination of parts, as will be hereinafter fully described, and pointed out in the claims, reference being had to the accompanying drawings, in which—

Figure 1 is a side elevation, partly in section, of my improvement. Fig. 2 is a horizontal section on line 2 2 of Fig. 1. Fig. 3 is a sectional elevation of the adjusting and regulating device. Fig. 4 is a sectional elevation of the plunger and handle.

In carrying out my invention I use a tubular body A, which may be circular, square, or other suitable shape, the lower edge of which is sharpened so that it will readily cut into the butter. Within the tubular body is fitted air-tight a piston-head B, which is connected to the piston-rod B', which passes through the cap A' of the tubular body. A ring-stop $A^2$ is securely fastened to piston-rod B' at such a distance from its ends that when it is in close contact with cap A' the lower surface of plunger B will be flush with the lower edge of tube A. The piston-rod B', which is tubular, has a cap $B^2$ at its upper end and has delineated on its outer surface a tabular calculator by means of which the price of any given quantity of butter at different prices is instantly shown. In one side of the tubular rod B' is made a slot $b$ of suitable length, and within this slot is placed the rod C, which has at its lower end the stop C', said stop being secured to the rod C and projecting outwardly through said slot $b$. The upper end of rod C has a threaded pin $c$, projecting to one side, said pin being passed through an opening made in a ring D, which surrounds the tubular piston-rod B' and may slide up and down on the same. The rod C is held to the ring D by means of a nut $c'$ screwing on the threaded pin $c$. On said ring D is delineated the different prices per pound, as shown in Fig. 1. The stop on the lower end of rod C will prevent bar from being pulled too far, as said stop will engage the cap A'.

As shown, the upper part of the tubular piston-rod is graduated into pounds and fractions of pounds and also computing prices. The ring D, which slides on the piston-rod, is graduated to correspond with the division on the piston-rod, each division showing price per pound.

The manner of using my improvement is as follows: The slide-ring D is slipped along the tubular rod to the graduation showing the amount by weight of butter that is desired. The thumb-nut is then tightened so that ring D and the stop C at lower end of rod C are clamped in position and cannot change. Then push the piston-rod down as far as it will go—that is, until the fixed stop-ring $A^2$ engages the cap A'. Then the piston-head will be flush with the lower edge of the tube. Then place the lower end of the tube with which the piston-head is flush on the butter. Now press the tubular body down into the butter until the stop at the lower end of the rod C strikes the cylinder-head. Then pull the cylinder out of the butter, whereupon it will be found that the tubular body below the piston-head A' is full of butter. As the butter may be roughly separated at the mouth of the tubular body, it may be smoothed off with a butter spade or paddle. The tubular body will now be found to contain exactly the amount of butter desired. Then push the piston down again, and the roll of butter will be expelled from the tubular body and found to be the exact weight desired or the amount in money-value at which the ring D was clamped.

The underlying principle of the operation of my improvement is a vacuum, as by using an air-tight piston or plunger, which is in contact with the butter in the tube or cylinder A, that butter will not drop out, as air-pressure holds it there.

From the above it will be observed that I produce a simple, cheap, and efficient device which will weigh and compute the price of butter accurately when properly graduated.

I claim—

1. A device for cutting, weighing and computing the price of butter, &c., comprising a tubular cup open at its lower end, a tubular piston or plunger, the side wall of which has a vertical slot, said plunger adapted to slide air-tight within said cup, and means coacting with said plunger and slot for regulating and governing the degree of movement of said piston or plunger.

2. A device for cutting, weighing and computing the price of butter, &c., comprising a tubular cup open at its lower end, a tubular plunger fitted to slide air-tight therein, and having a vertical slot in its side wall, a stop member connected with said slotted plunger to limit its downward movement, and another stop member slidably held in said vertical slot to limit the upward movement of the plunger, and graduations on said plunger indicative of weight and price.

3. A device for cutting, weighing and computing price of butter, &c., consisting of a tubular cup open at its lower end, a plunger fitted to slide air-tight therein, a stop member connected with said plunger to limit its downward movement, and another stop to limit its upward movement, and graduations on said plunger indicative of weight and price.

4. A device for cutting, simultaneously weighing and computing the price of butter, consisting of a tubular cup open at its lower end, a piston fitted to slide air-tight therein, a piston-rod projecting through the top of said cup, and provided with graduations indicating weight and price on its outer face, a rod slidably fitted in one side of said piston-rod, said slidable rod having a projecting stop at its lower end, and secured to a ring slidably mounted on the piston-rod above the cup, said ring also provided with graduations indicating price.

5. In a device for cutting, weighing and computing the price of butter, &c., and comprising a tubular cup open at its lower end and a tubular plunger fitted to slide air-tight in said cup, a graduated scale indicating weight and price delineated on the outer surface of said tubular plunger.

DAVID F. CURTIN.

Witnesses:
E. F. CAMERON,
P. E. GARDNER.